United States Patent
Forgatsch et al.

(10) Patent No.: US 7,614,694 B2
(45) Date of Patent: Nov. 10, 2009

(54) SEAT, IN PARTICULAR AIRCRAFT PASSENGER SEAT COMPRISING A COVER PART WITH A VARIABLE PRE-TENSION

(75) Inventors: Oliver Forgatsch, Meersburg (DE); Andreas Erb, Wangen i.A (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 186 days.

(21) Appl. No.: 11/794,819

(22) PCT Filed: Mar. 22, 2006

(86) PCT No.: PCT/EP2006/002625

§ 371 (c)(1),
(2), (4) Date: Jul. 6, 2007

(87) PCT Pub. No.: WO2006/103016

PCT Pub. Date: Oct. 5, 2006

(65) Prior Publication Data

US 2008/0018153 A1      Jan. 24, 2008

(30) Foreign Application Priority Data

Mar. 31, 2005   (DE)   .................. 10 2005 015 143

(51) Int. Cl.
A47C 7/14   (2006.01)
A47C 7/32   (2006.01)

(52) U.S. Cl. .............. 297/284.2; 297/284.1; 297/284.4; 297/284.7; 297/284.8; 297/452.56

(58) Field of Classification Search ............. 297/284.1, 297/284.2, 284.3, 284.4, 284.5, 284.7, 284.8, 297/452.56

See application file for complete search history.

(56) References Cited

U.S. PATENT DOCUMENTS

| | | | | |
|---|---|---|---|---|
| 3,258,259 | A | | 6/1966 | Bohlin |
| 4,124,252 | A | * | 11/1978 | Safir .................... 297/284.2 X |
| 4,339,150 | A | * | 7/1982 | McNamara et al. ...... 297/284.8 |
| 4,702,522 | A | * | 10/1987 | Vail et al. .............. 297/452.56 |
| 4,712,834 | A | | 12/1987 | Warrick |
| 5,092,654 | A | * | 3/1992 | Inaba et al. .............. 297/284.7 |
| 5,449,219 | A | * | 9/1995 | Hay et al. ................ 297/284.4 |
| 5,474,358 | A | * | 12/1995 | Maeyaert ................ 297/284.7 |
| 5,482,353 | A | | 1/1996 | Lance |

(Continued)

FOREIGN PATENT DOCUMENTS

AU     80 449/82     8/1983

(Continued)

*Primary Examiner*—Rodney B White
(74) *Attorney, Agent, or Firm*—Posz Law Group, PLC

(57) ABSTRACT

The invention to a seat, in particular an aircraft passenger seat, comprising seat components such as a seat (10) and a backrest (12), in addition to at least one cover part (20), which is pre-tensioned in at least one direction and at least one section and which extends between frame parts (24) of an allocated seat component. As the seat is provided with at least one controllable adjusting unit (26), which permits the specification of different pre-tensions for the respective cover part (20) within a predefinable range and in a reversible manner, the respective seat user, who occupies the seat can adapt the seat to his or her comfort and health requirements.

11 Claims, 5 Drawing Sheets

U.S. PATENT DOCUMENTS

| | | | |
|---|---|---|---|
| 5,797,652 A | | 8/1998 | Darbyshire |
| 5,957,532 A | * | 9/1999 | Watkins .................. 297/284.2 |
| 6,079,783 A | * | 6/2000 | Schuster et al. .......... 297/284.1 |
| 6,588,842 B2 | * | 7/2003 | Stumpf et al. ............ 297/284.4 |
| 6,669,143 B1 | | 12/2003 | Johnson |
| 6,837,541 B2 | * | 1/2005 | Farquhar et al. ...... 297/284.4 X |
| 6,991,288 B2 | * | 1/2006 | Farquhar et al. ...... 297/284.4 X |
| 7,128,372 B2 | * | 10/2006 | Farquhar et al. ......... 297/284.4 |
| RE39,604 E | * | 5/2007 | Watkins .................. 297/284.2 |
| 7,270,374 B2 | * | 9/2007 | Moriggi .................. 297/284.4 |

FOREIGN PATENT DOCUMENTS

| | | |
|---|---|---|
| DE | 22 16 667 | 10/1973 |
| GB | 360 516 | 11/1931 |
| GB | 2 035 792 | 6/1980 |
| GB | 2 335 843 | 10/1999 |

* cited by examiner

SEAT, IN PARTICULAR AIRCRAFT PASSENGER SEAT COMPRISING A COVER PART WITH A VARIABLE PRE-TENSION

The invention relates to a seat, in particular an aircraft passenger seat, with seat components, such as a seat part and a backrest, as well as at least one cover part, which has pretensioning in at least one direction and at least in certain sections and extends between frame parts of a corresponding seat component.

A seat of this type in the form of an aircraft seat, in which up to three individual seats configured in a row adjacent to one another together form a row of aircraft seats, is known through U.S. Pat. No. 6,669,143 B1. Each seat has a shell-shaped base in which the backrest and the respective seat part are incorporated as rigidly designed base frames. To increase the comfort of the aircraft passenger or seat occupant, the backrest can glide downward within the corresponding backrest shell, and the seat part simultaneously moves forward in the longitudinal direction of flight with the increase of seat depth, whereby for improved comfort, an actuating device can swing a corresponding leg support out at the free end of the front edge of the seat part. To be able to ensure a friction-free sequence of movements, pairs of rollers are provided at least on the edge of the shell-shaped base along which the base frame of the backrest and seat part is displaceably guided.

For improved comfort, in particular in the backrest area, individual bow-shaped expansion elements extend in particular in the backrest area crosswise to the longitudinal direction of the seat, and said elements, viewed in the direction of flight, have a swell or a projection, via which an elastic cover part that is drawn with pretensioning is in contact with the latter and in this way allows pretensioning of the cover material for the seat, in which the seat occupant subsequently sits and is kept in the seat. In particular in the lower back area, a so-called lumbar support is thus provided that makes it easier for the seat occupant to work the seat and contributes to his sense of well-being, even on long flights. The known solution of a seat with a cover part with pretensioning is always only designed for the average weight of a seat occupant, and in particular there is no way to adapt the pretensioning of the cover part individually to each respective seat occupant.

On the basis of this prior art, the object of the invention is therefore to further improve the known seating solution while retaining its advantages to the extent that the latter can be matched individually to the requirements of a number of seat occupants. This object is achieved by a seat with the features specified with Claim 1 in its entirety.

In that, as specified in the characterizing part of Claim 1, at least one actuatable adjustment device is present and makes it possible to preset various pretensioning values, in a presettable range and in a reversible manner, for the respective cover part, and the seat occupant can in each case adapt the seat individually to his comfort and health requirements. With the adjustment device, pretensioning regarded as comfortable can be preset, and with this pretensioning, the respective body parts of the seat occupant are then supported on the seat, in particular in the area of the backrest. The respective pretensioning can be adjusted in a relatively wide range and also completely reversibly detached again, so that a type of dynamic seating design is produced, which opens up the possibility to the seat occupant of performing the most varied adaptations during flights, in particular in the case of extended flights. Thus, for example, for working or for taking meals, the seat can be made stiffer and softer, if it is brought into a resting position to improve the comfort when the backrest is brought into a resting position.

The seating solution according to the invention is not limited to an insert in the backrest, but rather also allows a firmness adjustment for the seating on the seat part and can optionally also be used for a leg and/or footrest. In this case, provision is preferably made such that to achieve different pretensioning values for the respective cover part in a tensioning position, several adjustment devices are present, so that the pretensioning thus can be adjusted in sectors in a variable and individual way. Along a backrest or seat part surface area, a soft seat support thus can be made in an adjustment area and a correspondingly harder one can be made in another area. By oscillating stimulus of the respective adjustment device, the introduction of tensile forces into the respective cover part can be varied like pulses so that massage functions can also be carried out over the cover part. It is surprising that with low actuating forces on the adjustment device, a considerable change of the pretensioning on the cover part is already applied so that an increase in seat comfort can be carried out very smoothly.

The seating solution according to the invention is economical in implementation and operates reliably in use, so that it is very readily usable even in the economy seating area of aircraft. The seating solution according to the invention does not need to be limited to use in aircraft, but rather can also be used in other vehicles, such as ferries, buses, or the like. Also, applications are also conceivable, such as in equipping concert halls and movie theaters with seats as well as in the medical field as dentist chairs or treatment beds.

Other advantageous embodiments are the subject matter of the additional dependent claims.

Below, the seat according to the invention will be explained in greater detail based on various embodiments. The figures are schematic and not to scale.

Figure 1:
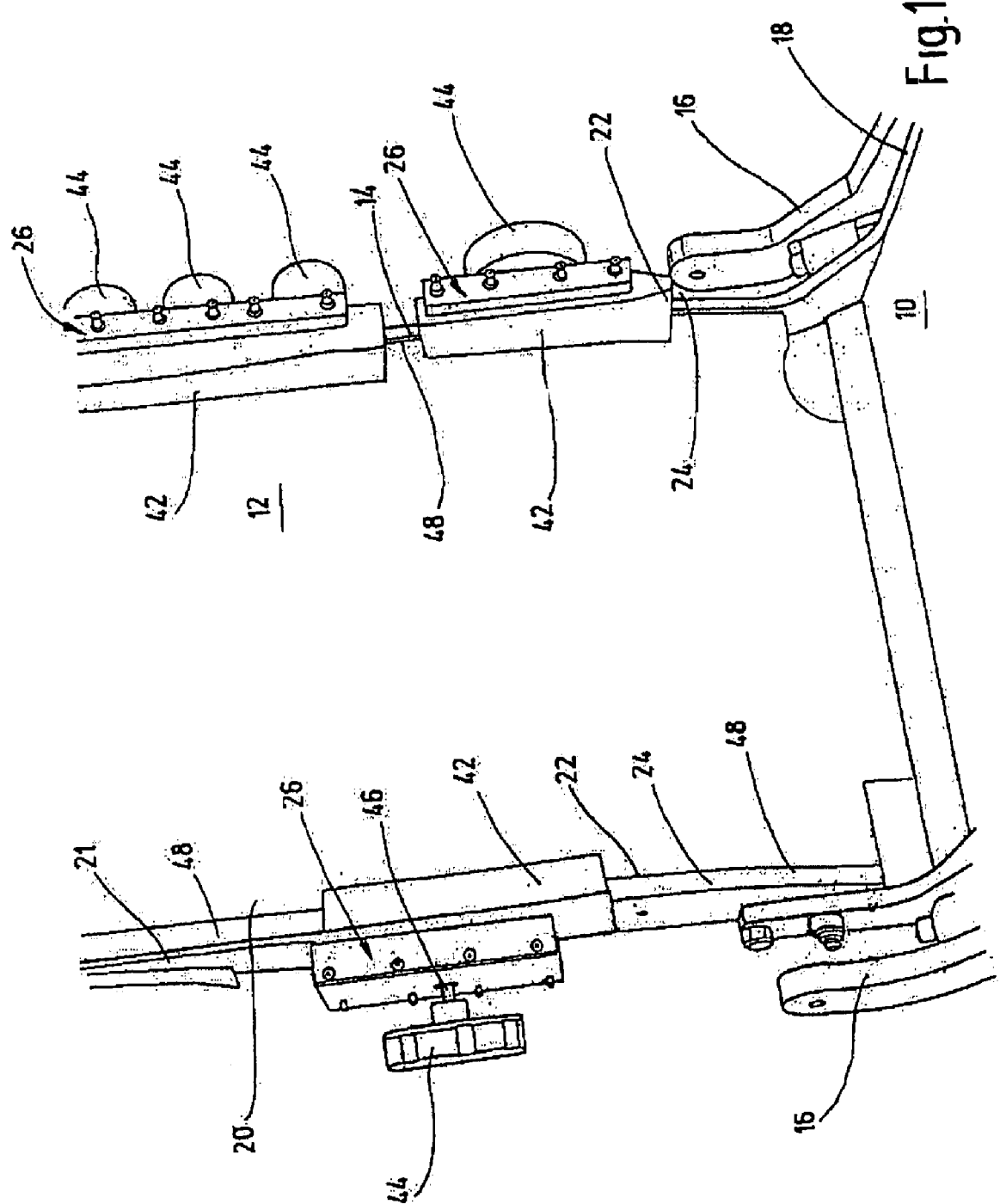
FIG. 1 shows a perspective view of a portion of a seat in the form of an aircraft seat without cushion foam parts as well as without a cover material.

The seat that is partially shown in FIG. 1 in a type of basic position has seat components such as a seat part 10 as well as a backrest 12. The backrest 12 has a frame profile 14, in particular in U-shape, as it is depicted in improved form, by way of example, in the view in FIG. 3. The above-mentioned frame profile 14 is extended according to the view, according to FIG. 1, between two angular structural parts 16, on which armrests, not shown in greater detail, are subsequently movably fastened in the upper area. In the lower area, the frame profile 14 is preferably pivot-connected with a carrier structure 18, which carries the platelike seat part 10 and which has a support leg design that is not shown in greater detail on its underside, by means of which the seat can be mounted upright relative to a cabin floor and can be attached to the latter. The applicable design of the aircraft seats is conventional, so that at this point, no further detail is necessary.

Furthermore, for the sake of better representation, the cushion materials and other cover materials on the seat are omitted. A cover part extends within the U-shaped frame profile 14, and its two free longitudinal edges 22 run parallel to the two longitudinal frame parts 24 of the frame profile 14. Also, in each case, adjustment devices, referred to as a whole with 26, which make it possible to preset various pretensioning values, in a presettable range and in a reversible manner, for the respective cover part 20, are present. For this purpose, by means of the respective adjustment device 26, the corresponding cover part 20 or parts thereof in the direction of at least one frame part 24 can be tensioned crosswise to the longitudinal direction of the seat in various tensioning positions and can be fastened in these positions as well as in a reversible manner to achieve a detachment position. For this purpose, provision is made such that with increasing action of the adjustment device 26, tensioning positions produce greater pretensioning and that in the detachment position, a presettable starting value of a basic pretensioning is achieved.

Figure 2:
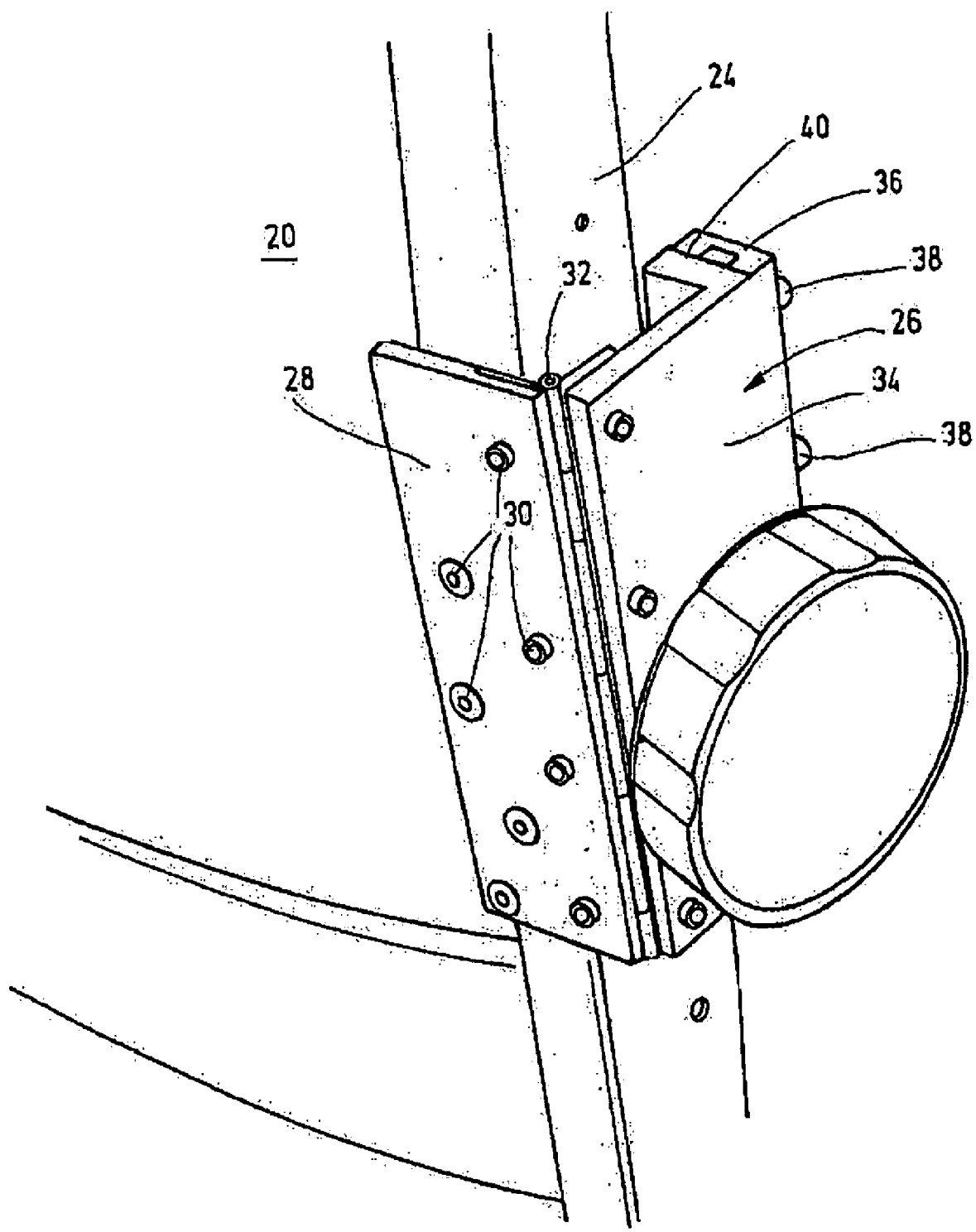
FIG. 2 shows, in an enlarged view, a perspective elevational view of a component of the adjustment device for a seat solution according to FIG. 1.

For a more detailed explanation of the adjustment device 26, the latter can now be explained in greater detail based on a concrete embodiment according to FIG. 2. The adjustment device 26 that is shown there engages with an angular stop 28 as an attachment plate of the rear area of a longitudinal frame part 24. Via corresponding rivet and screw joints 30, the corresponding solid connection is produced. In particular, the number of rivet and screw connections 30 allows a high application of force of tensile force and pretensioning forces via the adjustment device 26 in the basic structure of the seat in the form of corresponding longitudinal frame part 24. In the stop 28, a crosswise plate 34 is hinged via a hinge connection 32 such that the latter is held along both sides via a presettable measurement to pivot on the stop 28. For this purpose, the stop 28, viewed in the direction of looking at FIG. 2 and on the edge side, has a projection, and the crosswise plate 34 extends in its initial position and while maintaining this distance at a right angle to the stop 28.

On its front free end, the crosswise plate 34 is bent at an angle and carries on its front a U-shaped clip part 36 in the form of a contact strip, whose position can be adjusted by means of individual screws 38 from its free clamping gap 40. As FIG. 1 in particular shows, the free longitudinal edges 22 of the cover part 20, optionally provided with an additional edge reinforcement 42, engage in this clamping gap 40. For the sake of simplified representation, the corresponding engagement is not reproduced in FIG. 2. In approximately the middle and from the outside, the crosswise plate 34 is provided with a hand wheel 44, which on its free front end has a double-end stud 46 with an outside thread, which engages a threaded sleeve, not shown in greater detail, with an inside thread on the inside of the crosswise plate 34, to thus effect the connection to the other adjustment device 26. The free end of the double-end stud 46, not shown in greater detail, is then supported in any functional adjustment of the hand wheel 44 on the outside of the respective long frame part 24. If the hand wheel 44 is closed, i.e., screwed in the direction of the frame part 24, the crosswise plate 34 is closed to the hand wheel 44 via the screw sleeve and viewed in the direction looking at FIG. 2, the crosswise plate 34 pivots in clockwise direction around the hinge connection 32 by a presettable amount. The corresponding amount of pivot, which moves away by this amount from the opposite frame part 24 and thus is tensioned, then corresponds to an increased introduction of tensile force in the cover part 20.

Viewed in the direction looking at FIG. 1, two identical adjustment devices 26 according to FIG. 2 are configured at different height positions on the backrest frame, so that the introduction of force is carried out at various tension or height positions, the cover part 20 being secured to the linear attachment points 48, always seen on the opposite end from the respective adjustment device 26, for example by the cover part 20 having been stitched tight at the edge side along the frame parts. It is surprising to the average individual skilled in the art that he obtains a very fine degree of adjustment for the pretensioning in the cover part 20, which also can be detached again up to a presettable starting value when the hand wheel 44 is moved in the opposite direction with two adjustment devices 26 of the above-mentioned type that are present at different height positions.

If the cover part 20, among other things, is provided on its front side with corresponding cushion materials and cover materials, the suitably altered pretensioning is transferred to the above-mentioned parts and to the back area of a seat occupant that is not shown in greater detail. The corresponding adjustment possibilities could in principle also be provided for a cover part of the seat part 10, not shown in greater detail, as well as in the area of, for example, leg and/or footrests, not shown in greater detail, subsequent to the respective seat part 10. Also, the possibility basically exists to introduce an indicated adjustment device 26 on the top side of the U-shaped frame profile 14 to then regulate the pretensioning of the cover part 20 in the longitudinal direction of the seat.

In the embodiment shown, the cover part 20 is determined integrally as a flexible surface material and thus forms a type of textile fabric; here, however, even embodiments that are not depicted in greater detail are conceivable, in which the cover part extends strip-like between the longitudinal frame parts 24 or forms a type of net or lattice structure. Also, the possibility would also exist, instead of a fabric for the cover part 20, to design the latter from single filaments, optionally also with inserted intermediate coupling elements in the form of spring elements and each individual filament as an individual stringer or groups thereof of an adjustment device 26 (not shown).

On the top right, viewed in the direction of looking at FIG. 1, a modified adjustment device 26 is shown with three individual hand wheels 44 that are configured over one another in a series, which act together on a crosswise plate 34 of the adjustment device 26. It has been shown that in particular with the corresponding configuration, a very good fine adjustment for the pretensioning that is desired in each case can be achieved and that here the pretensioning values that are very exactly advantageous here for a seat occupant can be allowed. Instead of the hand wheels 44 that are shown, which preferably can be adjusted based on the seat occupant, basically also the possibility of the pretensioning adjustment exists via actuators, not shown in greater detail, such as pneumatic working cylinders or the like, to thus ensure the respective adjustment in a reversible manner via a central control point. The respective hand wheels 44 can be provided with markings, not shown in greater detail, to thus give the seat occupant information, visually detectable from outside, on the respective adjustment situation and the pretensioning situation for the cover part 20.

Figure 3:
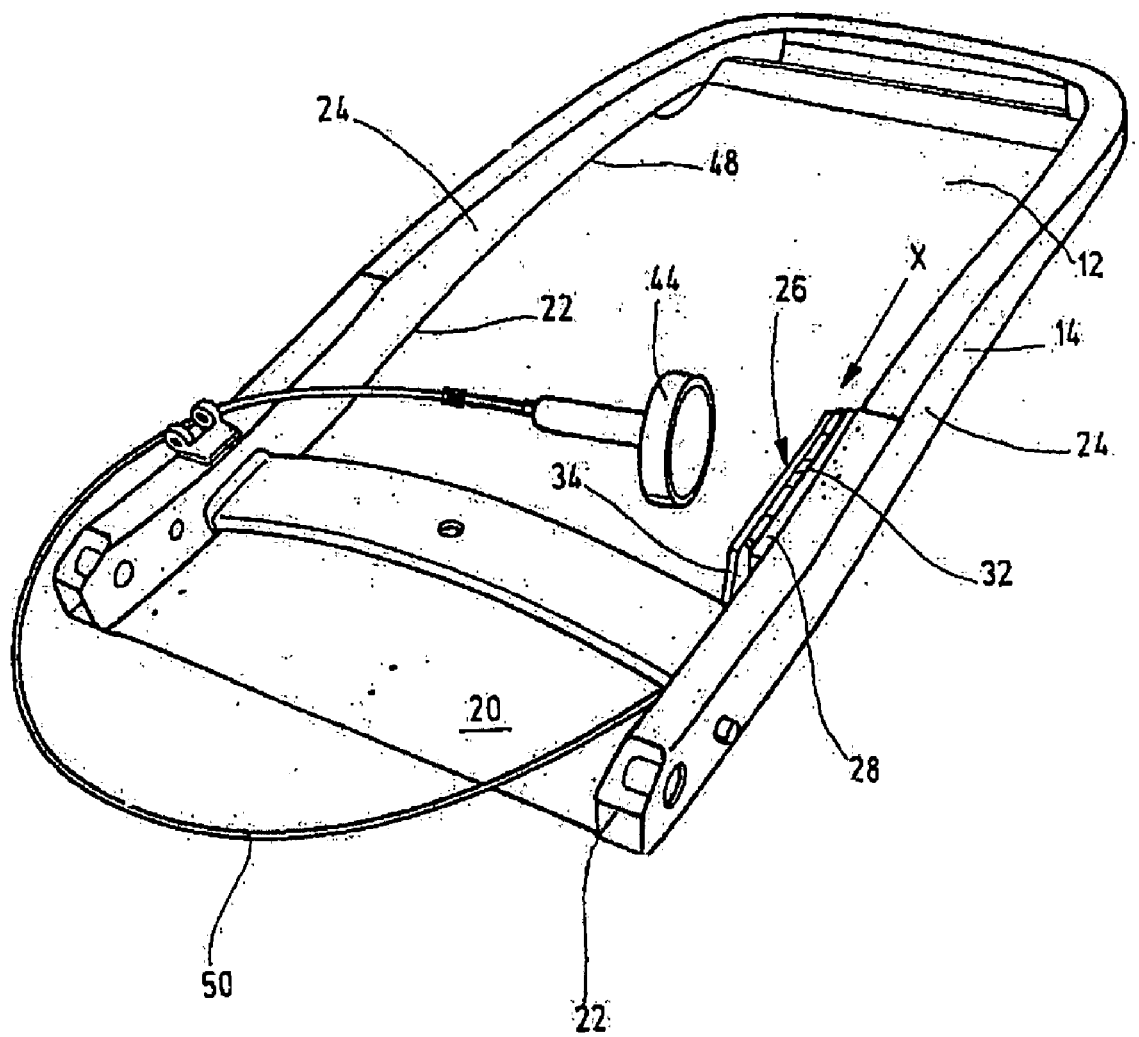
FIG. 3 shows, in a rear, perspective view, a fully reclined backrest according to FIG. 1.
Figure 4:
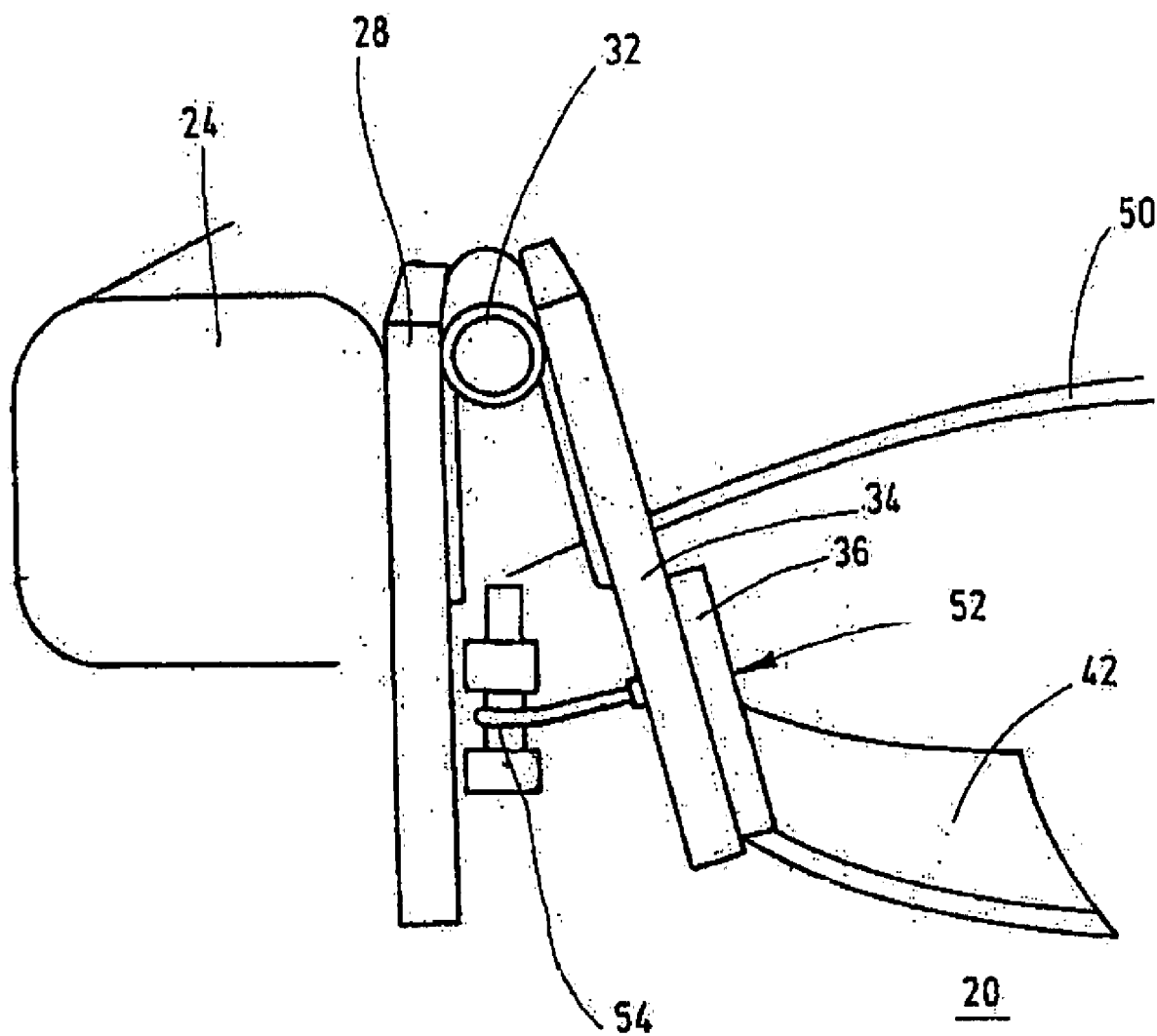
FIG. 4 shows a front view of a modified embodiment of the adjustment device, viewed in the direction of looking at arrow X in FIG. 3.

The embodiment below according to FIGS. 3 and 4 is explained only to the extent that it significantly differs from the preceding embodiment. Here, the same functional components are provided with the same reference numbers so that the statements previously made also apply to the amended embodiments.

In the embodiment according to FIG. 3, the hand wheel 44 is coupled to a conventional Bowden cable 50, and the free end of the Bowden cable in the form of a wire end (52) (cf. FIG. 4) engages the crosswise plate 34, which in turn receives in clamping position an edge reinforcement 42 in the rear area of the cover part 20 via a large-area clip part 36 as a coupling part. The crosswise plate 34 is in turn hinged to pivot via a hinge connection 32 to the angular stop 28, in a departure from the first embodiment, the corresponding stop 28 resting expansively on the inside of a corresponding longitudinal frame part 24. The wire end 52 is otherwise deflected coming around a pin- or roller-shaped deflecting point 54 between crosswise plate 34 and stop 28 in a right angle from the pulling direction of the Bowden cable 50 and pulls the Bowden cable 50 in the corresponding activation of the hand wheel 44, and the wire end 52 pulls the crosswise plate 34, inclined at an angle, in the direction to the stop 28 with the result that the edge reinforcement 42 of the cover part 20, which is secured via the clip part 36, is subjected to a tensile force in the direction toward the longitudinal frame part 24 with the result that the pretensioning of the cover part 20 is increased. On the opposite side of the adjustment direction 26, the cover part 20 in turn is connected securely to the opposite frame part 24 along the attachment points 48 (FIG. 3).

If the hand wheel 44 in the amended embodiment is rotated in the opposite direction, the pretensioning is detached, and the cover part 20 can return again to a specified starting position under the action of the physical strength of the seat occupant. Also, in the corresponding amended embodiment, the hand wheel can be replaced by a suitable actuator device (not shown) that can be controlled from outside. Instead of a textile material, which preferably is nonflammable, plastic cover solutions can also occur, but must not be rigidly designed as then the introduction of a tensile force changing the pretensioning would no longer be possible.

Figure 5:
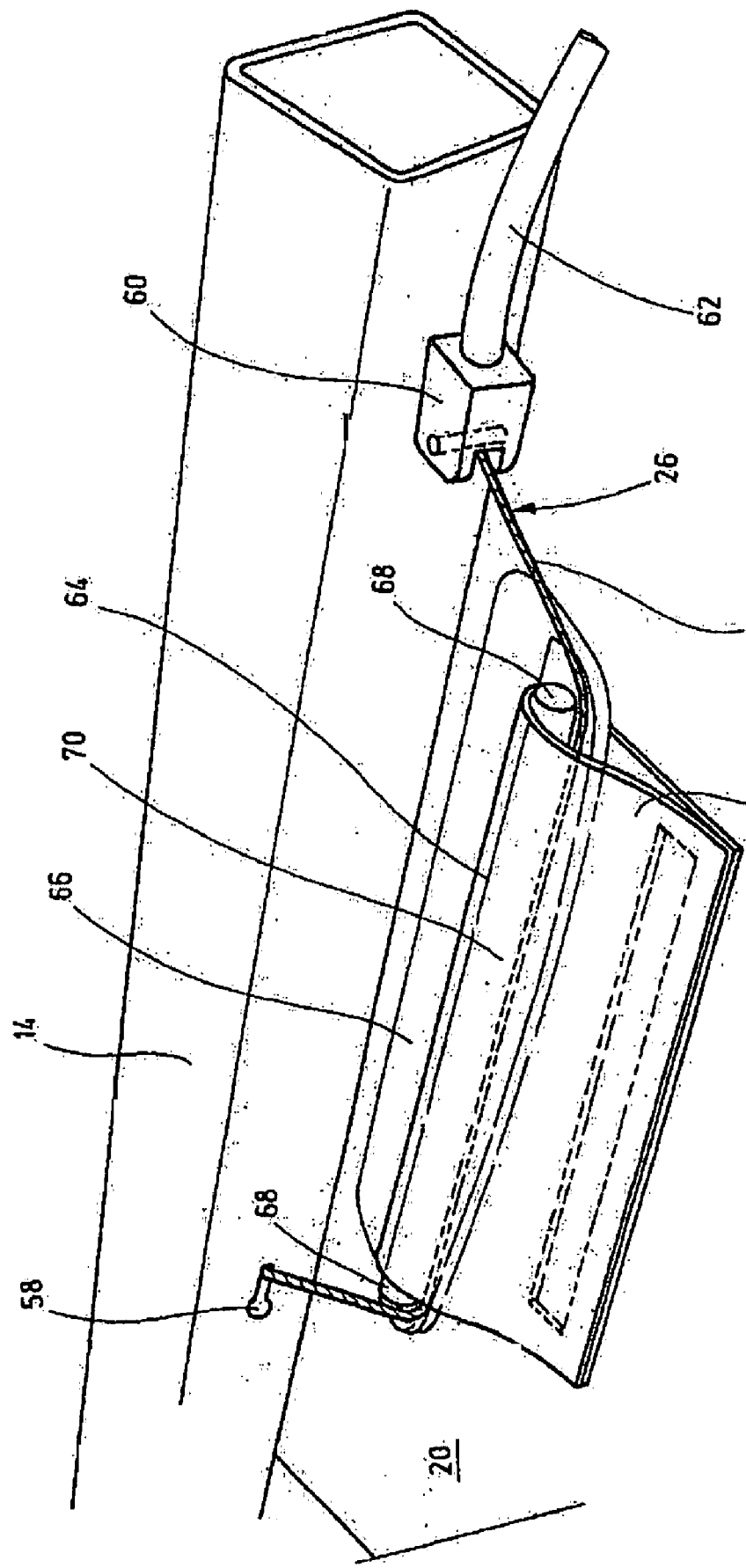
FIG. 5 shows a perspective view of another modified embodiment of the adjustment device.

In the embodiment according to FIG. 5, an edge reinforcement 42 in the form of a loop-like fabric material is attached, for example sewed on, to the rear side of the cover part 20. A wire cable is guided through the loop as part of the adjustment device 26, and said cable engages on its free end area, shown in FIG. 5, in a key-like recess 58 in the frame profile 14, which is partially reproduced only as a side cross-piece, cut off in FIG. 5. To this end, the above-mentioned wire end has a corresponding thickening, for example in the form of a spherical end piece, not shown in greater detail, which can be used in the expanded opening of the recess 58 and then is interlocked by being gripped from behind in the slot-shaped tapering of the recess 58 according to the view according to FIG. 5.

Opposite, the wire cable 56 is run over a deflecting device 60 located on the inside on a frame profile 14 with integrated deflecting pins and is then taken up in a cable guide 62, which empties at its free end into an actuating hand lever, not shown in greater detail, which has a deflecting roller for the other free cable wire end, which allows a starting movement of the cable 56 that is comparable to the winching solutions in sailboats in which a direction is controlled by levers, and the return movement in the other direction is inhibited until the hand lever is returned into its starting position. The cable piece guided into the loops can thus be pulled in the direction of the spar of the backrest profile 14, and thus a pretensioning in the cover part 20 can be introduced. To protect the textile loop area of the edge reinforcement 42, the loop penetrates a slot guide 64 in a flat base plate 66 that is designed in particular to be longer than the above-mentioned loop penetration and that has in each case a guide roller 68 on the end at the exit of the loop, along which each inside length of the cable 56 is guided. To ensure a secure guidance, moreover, a second guide plate 70 can be provided, which occupies an axial distance on the base plate 66, the respective guide roller 68 then extending in the thus formed distance and the above-mentioned cable piece, guided in the loop, is then covered on both sides within the loop by the plates 66, 70 so that damage of the sensitive loop area definitely will not occur.

As a general rule, a type of "loose roller" is produced by the correspondingly modified adjustment device 26, by which the activating force is minimized. In this case, it is also important that a type of bearing for the subsequent Bowden cable system be provided via the deflecting device 60 with its almost orthogonal deflection for the cable 56. Instead of the above-mentioned guide rollers 68, a type of guide channel could also be provided at least on one side of the respective plate 66 and/or 70 along which the wire cable 56 can be guided.

Since a significant influence on the sense of well-being of a passenger is brought about by the contour of the backrest 23, and the latter decisively influences the so-called musculoskeletal system of an aircraft seat, an adaptation of the lengthwise contour of the back primarily in the lumbar area is necessary to increase the sense of well-being, whereby with the individual seat-adjusting possibilities according to the invention, differences based on body size, individual physique as well as weight can be considered. The solution according to the invention can be achieved very economically and is very reliable in use especially when individually adjusted by hand.

The invention claimed is:

1. A seat, in particular an aircraft passenger comprising:
   a backrest with at least two opposite frame parts having a longitudinal direction and with at least one cover part, which is made of at least a continuous part, which is made of flexible surface material, extending between the frame parts and having a pretensioning in at least one direction; and
   at least two actuatable adjustment devices for adjusting the pretensioning of the continuous part in a reversible manner.

2. The seat according to claim 1, wherein by means of the adjustment devices, the corresponding cover part can be tensioned, starting from a release position, in the direction of at least one frame part crosswise to the longitudinal direction of the frame parts in various tensioning positions and can be secured in these positions, and wherein the release position can be achieved from one of the secured positions.

3. The seat according to claim 2, wherein with increasing action of the adjustment devices, tensioning positions of greater pretensioning values follow, and in the release position, a given starting value of a pretensioning is achieved.

4. The seat according to claim 1, wherein the adjustment devices are distributed over one of the frame parts and can respectively produce different tensile forces in the cover part.

5. The seat according to claim 4, further comprising a seat part, wherein the adjustment devices are respectively arranged at different heights with respect to the seat part.

6. The seat according to claim 1, wherein the two adjustment devices are respectively arranged on opposite frame parts.

7. The seat according to claim 6, further comprising a seat part, wherein the adjustment devices are respectively arranged at different heights with respect to the seat part.

8. The seat according to claim 1, wherein the frame parts form a space as a component of the backrest, which is spanned at least partially by the cover part.

9. The seat according to claim 1, wherein at least one of the adjustment devices causes a tensile force to be applied to the cover part with a clip part.

10. The seat according to claim 1, wherein the cover part consists of a single-layer fabric in the form of a two-dimensional textile fabric.

11. The seat according to claim 1, wherein the adjustment devices cause a tensile force to be applied to the cover part respectively via a coupling part and the adjustment devices by means of actuating a hand wheel to move the respective coupling part towards one of the corresponding frame parts for an increase in the tensile force.

\* \* \* \* \*